(No Model.)
S. RÖTHLISBERGER.
TWO WHEELED VEHICLE.
No. 339,215. Patented Apr. 6, 1886.
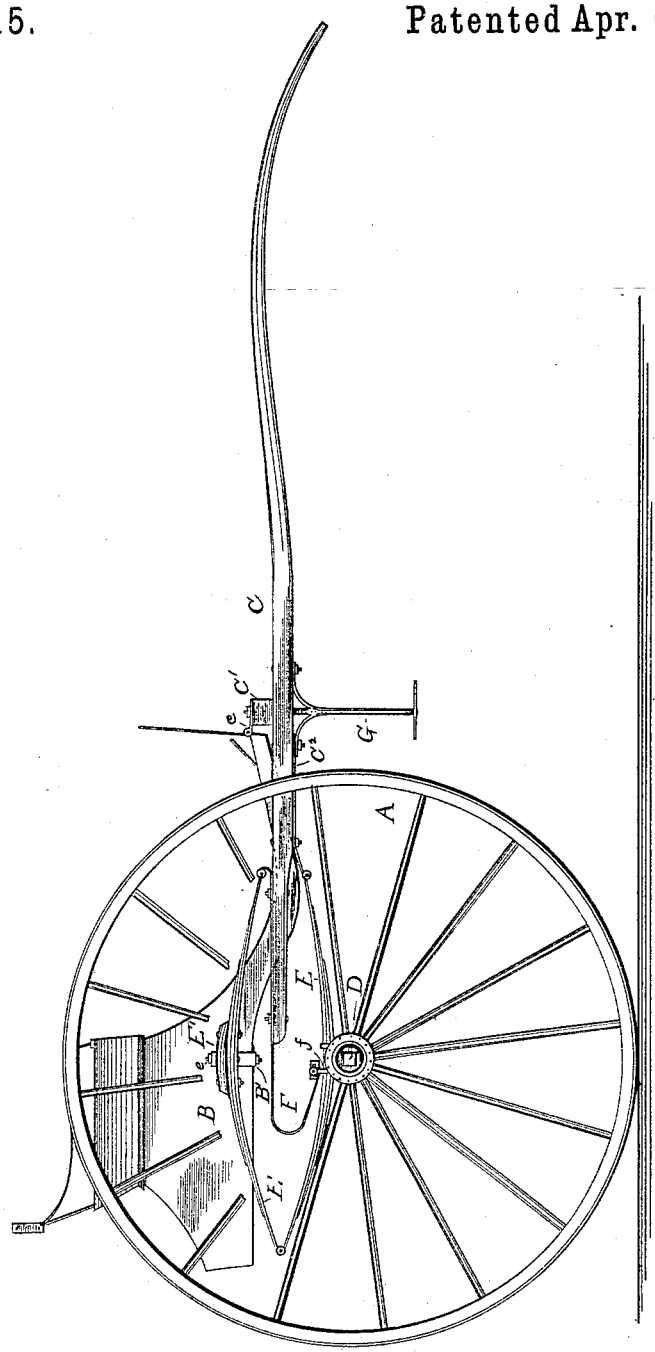
Witnesses:
Elihu P. Stowe,
Lewis Denn
Inventor.
Samuel Röthlisberger.
By Joshua B. Webster Atty.

UNITED STATES PATENT OFFICE.

SAMUEL RÖTHLISBERGER, OF STOCKTON, CALIFORNIA.

TWO-WHEELED VEHICLE.

SPECIFICATION forming part of Letters Patent No. 339,215, dated April 6, 1886.

Application filed September 10, 1885. Serial No. 176,659. (No model.)

*To all whom it may concern:*

Be it known that I, SAMUEL RÖTHLISBERGER, a citizen of the United States, residing at Stockton, in the county of San Joaquin and State of California, have invented certain new and useful Improvements in Two-Wheel Vehicles, of which the following is a specification, reference being had therein to the accompanying drawing.

The figure is a side elevation of my improved two-wheeled vehicle.

Similar letters of reference indicate corresponding parts.

The object of my invention is to furnish a two-wheeled vehicle that shall be simple in construction and convenient in use, being very easy and comfortable even in fast driving over rough roads and inexpensive to repair.

A are the wheels. B is the body. C are the shafts.

The shafts C are connected together just in front of the body and wheels by a cross-bar, C', to which the front of the body B is attached by a hinge, c.

To near the center of each side of the body B beneath it is an angular iron standard, B', the top of which is attached to a block, E', by a bolt, e, by which bolt the block E' is also attached to the top of an elliptic spring with one end spread apart in front, such ends being attached, as will be shown.

To the top of the rear of each shaft C is attached the forward upper end of a hook-shaped spring, F, the rear end of which is attached to the eye of a standard of a clip, $f$, connected to the axle D. At the connection of the spring F with the eye of this standard is a slot forming the end of the spring, through which slot and the eye of the standard is a pin or round shank-bolt, so that the end of the spring may move back and forth and prevent its breaking by a sudden jolt. The forward end of the spring F is slightly curved and is attached to the front upper end of spring E, which is attached to the axle by the clip $f$, and has its lower forward end attached to an iron strap, $C^2$, attached beneath the shaft near a step, G, whose standard is forked at its top, the rear fork being placed beneath the forward end of the strap $C^2$ and taking the same bolt that connects it to the shaft.

It will readily be seen that the attachment above described of the vehicle-body B to the shafts C is simple and inexpensive, and by means of the peculiar arrangement and connection of the springs E and F a very easy-riding vehicle is provided.

Having thus described my invention, what I claim as new, and desire to secure by Letters Patent, is—

1. The vehicle-body B, secured to the cross-bar C' of the shafts C by the hinge $c$ at its front, and at its rear by the angular iron standard B' to the blocks E', attached to the springs E by the bolts $e$, the springs E being attached to the straps $C^2$ and to the hook-shaped springs F, said springs F being attached, as shown, to the shafts G and the axle D, and the springs E to the axle D, as set forth.

2. The combination, substantially as described, with the axle D, the shafts C, and the springs E, of the hook-shaped springs F, having slots at their lower ends engaging by means of bolts with the eyes in the heads of the standards, of the clips $f$, secured to the axle D, substantially as and for the purposes described and herein set forth.

In testimony whereof I affix my signature in presence of two witnesses.

SAMUEL RÖTHLISBERGER.

Witnesses:
 JOSHUA B. WEBSTER,
 ELIHU B. STOWE.